United States Patent

[11] 3,572,947

| [72] | Inventor | Ola Sepall |
| | | Quebec City, Quebec, Canada |
| [21] | Appl. No. | 780,036 |
| [22] | Filed | Nov. 29, 1968 |
| [45] | Patented | Mar. 30, 1971 |
| [73] | Assignee | Anglo Paper Products, Limited |
| | | Quebec City, Quebec, Canada |

[54] APPARATUS FOR MEASURING UNIFORMITY OF SHEET MATERIAL BY LIGHT TRANSMISSION
5 Claims, 1 Drawing Fig.

[52] U.S. Cl. ................................................. 356/200,
250/219, 356/239
[51] Int. Cl. ..................................................... G01n 21/32
[50] Field of Search .......................................... 356/238,
239, 199, 200, 203; 250/219 (Webs), 219 (DF)

[56] References Cited
UNITED STATES PATENTS
3,114,791  12/1963  Zabel et al. .................. 356/199

Primary Examiner—Ronald L. Wibert
Assistant Examiner—Orville B. Chew, II
Attorney—Weir, Marshall, Mac Rae & Lamb ABSTRACT: The sheet to be tested for uniformity is moved past a light-transmitting element having a surface in engagement with one side of the sheet. Light is applied to the opposite side of the sheet over a surface area at least as great as the area of the element surface and in opposed relation thereto. The light transmitted by the element is sensed to determine the average intensity and magnitude of variation thereof.

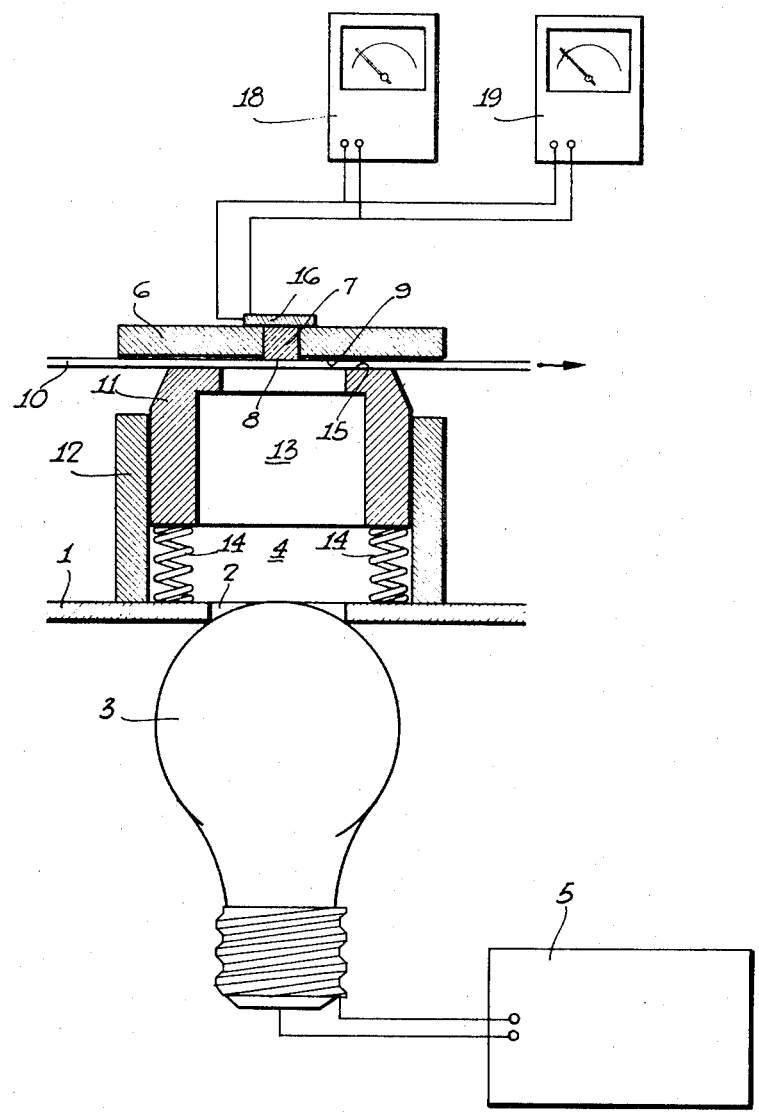

APPARATUS FOR MEASURING UNIFORMITY OF SHEET MATERIAL BY LIGHT TRANSMISSION

BACKGROUND OF THE INVENTION

1. Field of the Invention

The invention is in the field of optical scanning instruments employed for assessing the uniformity of sheets of paper, plastics, and the like.

2. Description of the Prior Art

The measurement of light transmission through sheets, such as those of paper and plastic, and particularly the measurement of localized variability in light transmission as an assessment of uniformity, has frequently been proposed in the past.

A number of instruments are available for the purpose and methods are well developed for interpreting parameters of variations in terms of light level and the fluctuating component. It is usual practice to convert the light signal to an electrical output and to measure average DC and AC components.

The instruments generally comprise (1) a system of illuminating the sheet by a small light spot produced by an appropriate combination of lenses, (2) a light-gathering system of lenses to focus the transmitted light on a photomultiplier as a light-sensing element, (3) a power supply for the photomultiplier, and (4) electronic amplification and monitoring equipment for sensing the average light level and variation in it. The equipment is complex and expensive, two disadvantages which have limited their application and relatively few are in use for production control or research work.

SUMMARY OF THE INVENTION

The present invention seeks to provide an apparatus for uniformity measurement of sheets which is simple and reliable and of relatively low cost.

The invention therefore seeks to lessen the limitations of conventional equipment by substantially eliminating 1. Use of a photomultiplier device which requires a separate, stable regulated DC power supply and amplifier to sense the output signal.
2. Use of a system of lenses to focus the scanning light spot on the sheet.
3. Use of a system of lenses to focus the transmitted light on the photomultiplier active area.

The invention resides in the concept of measuring the variation in light transmitted through a sheet in a certain area comprising (1) illuminating a large area of the sheet including the specific area of interest, (2) accepting transmitted light from only the area desired by means of a light transmitting element in contact with the sheet and of the appropriate area, (3) sensing the light intensity in the transmitting element by means such as a silicon solar cell or selenium cell which is desirably in contact with the transmitting element to sense most of the light transmitted, (4) providing movement of the sheet over the sensing element, and (5) measuring the electrical output of the light sensor as for example by the average DC output and average AC component.

BRIEF DESCRIPTION OF THE DRAWING

The single figure is a sectional elevation, in somewhat diagrammatic form, of an apparatus in accordance with the invention.

DESCRIPTION OF THE PREFERRED EMBODIMENT

In the drawing, 1 is a supporting table having an opening 2 through which light may be radiated from a source 3 on one side of the table to a space 4 on the other side of the table. Power supply for the light source 3 may be derived from a DC power source 5 of variable voltage.

An opaque plate 6, of metal or the like, is mounted in fixed position in opposed relation to the light source 3.

A light-transmitting element 7, such as a glass or plastic rod, is mounted in plate 6 in axially opposed relation to light source 3. Element 7 has an exposed surface 8 which is in the same plane as or protrudes slightly beyond the adjoining flat surface 9 of plate 6. Surfaces 8 and 9 are generally parallel to and in confronting relation to table 1.

A sheet 10 of material to be scanned is arranged to be moved along surface 9 and in wiping engagement with surface 8.

Means are preferably provided for ensuring snug contact of the sheet 10 with surfaces 8 and 9. One means for doing so is illustrated by way of example and comprises a tubular member 11 slidingly mounted in guide 12 on table 1 and having its bore 13 axially aligned between element 7 and light source 3. Springs 14 urge member 11 towards sheets 10 whereby its end surface 15 engages the sheet and exerts pressure thereon to hold it snugly in contact with surfaces 8 and 9. The diameter of bore 13 at end surface 15 is at least as great as and, as shown, several times that of surface 8 so that light from source 3 will be directed upon the entire area of sheet 10 in engagement with surface 8 of the element 7. Snug contact of sheet 10 with surface 8 is desirable in order to avoid spurious fluctuations in light transmission through element 7.

A light sensing device 16 is arranged to receive light transmitted through transmitting element 7. Device 16 may be a silicon solar cell, a selenium cell, or a similar sensor which is arranged to be illuminated only by the light transmitted through element 7.

As indicated in the drawing, the light-sensitive surface of device 16 is in direct contact with the end surface of element 7 opposite to surface 8. Device 16 may be fixed in this position by any suitable means such as bonding to the adjacent surface of plate 6.

Any suitable mechanism may be employed for moving sheet 10 past the light-transmitting element 7. The velocity is unimportant within a large range and thus no regulation of this factor is required. It is also quite satisfactory to move the sheet manually since steady measurements are readily obtained because frequency dependence is very small.

In operation, therefore, with the device energized, the sheet to be scanned is simply moved past the surface 8 of the light-transmitting element 7. A DC current is used from source 5 in order to obtain a light of constant intensity free of fluctuations such as would be created by AC current. The DC voltage is variably adjusted in order to adjust the light to different intensities needed for sheets of various opacities.

The light transmitted through the sheet and carried by element 7 to sensor 16 is measured as an electrical output signal from sensor 16. These output signals are measured by a DC voltmeter 18 and an AC voltmeter 19. The measured signals are at low level, usually in the range of 0.1 to 100 millivolts. Because the power available from the light sensor 16 is quite small, instruments with high input impedance are preferred for more sensitive measurements. Translation of the measurements into an indication of sheet characteristics is conventional.

An important feature of the invention resides in the ability to place the sheet in contact with a surface of the light-transmitting element which is of desired area whereby only the transmitted light corresponding to the area of that surface (which, in fact, is the uniform cross-sectional area of the element 7) is sensed by the device 16. In this manner it is possible to measure variability in light transmission for whatever area is of interest and without complex optical systems of lenses which have been used in equipment of this nature heretofore.

The use of light sensors, such as the flat silicon solar cell, is particularly suitable since such a sensor can be attached directly to the element 7 and shielded from extraneous light. Furthermore, as previously indicated, this device is much simpler and less costly than photomultiplier devices and yet possesses reproducible characteristics of adequate sensitivity for the present purpose.

I claim:

1. Apparatus for measuring uniformity of a moving sheet of material which comprises:

a. an open-ended tubular member;

b. a light source at one end of said tubular member for directing a beam of light therethrough;

c. an opaque member overlying the other end of said tubular member;

d. means urging said members towards each other for engagement therebetween of said sheet of material and confinement of said light beam;

e. a light-conducting element having a cross-sectional area less than that of said other end of said tubular member and extending through said opaque member in axial alignment with said tubular member;

f. a light-sensing cell fixed to said opaque member in direct contact with and completely overlying said light conducting element; and g. means for measuring the electrical output signal of said cell.

2. Apparatus for measuring uniformity of a moving sheet of material as defined in claim 1, said means urging said members towards each other comprising a spring upon which said tubular member is seated.

3. Apparatus for measuring uniformity of a moving sheet of material as defined in claim 1, said light conducting element being a transparent rod of uniform cross section.

4. Apparatus for measuring uniformity of a moving sheet of material as defined in claim 1, said light sensing cell being a silicon solar cell.

5 Apparatus for measuring uniformity of a moving sheet of material as defined in claim 1, said light-sensing cell being a selenium cell.